Jan. 3, 1928.

H. R. MERSELES

DISH RACK 1,655,281

Original Filed Aug. 17, 1922      2 Sheets-Sheet 2

INVENTOR
Henry R. Merseles
BY
Robert W Byerly
ATTORNEY

Patented Jan. 3, 1928.

1,655,281

UNITED STATES PATENT OFFICE.

HENRY R. MERSELES, OF BRONXVILLE, NEW YORK, ASSIGNOR, BY MESNE ASSIGNMENTS, TO HOBART MANUFACTURING COMPANY, OF TROY, OHIO, A CORPORATION OF OHIO.

DISH RACK.

Original application filed August 17, 1922, Serial No. 582,396. Divided and this application filed May 13, 1924. Serial No. 713,090.

This invention relates to dish racks for dish washing machines.

Objects of the invention are to provide a support for dishes and the like which will retain them in a position to receive the washing fluid most effectively regardless of the manner in which they are placed in the support, and a support for cups and glasses which will position them so that they may drain most effectively.

Figure 1:
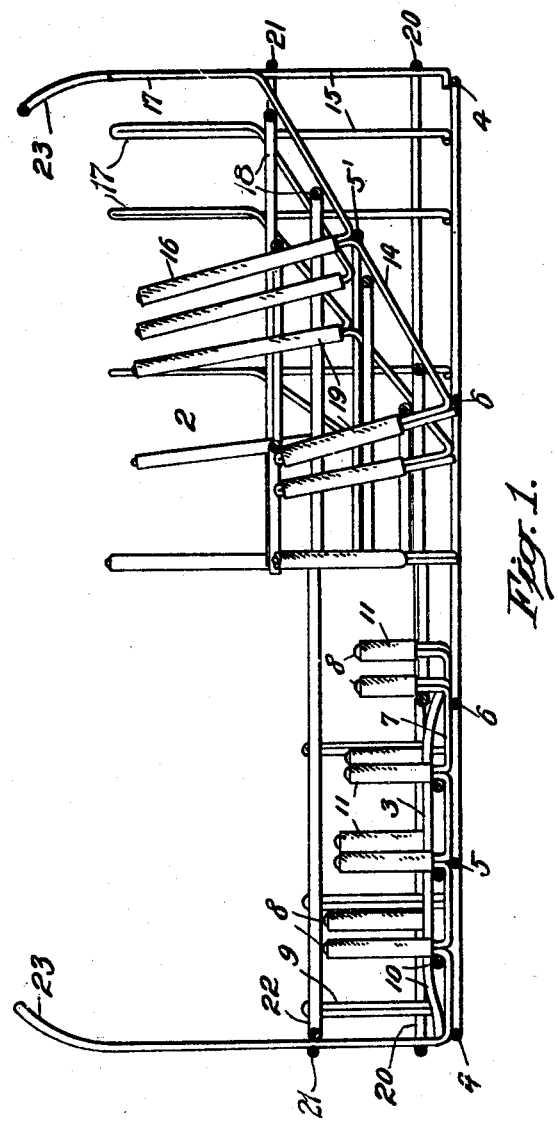
Figure 2:
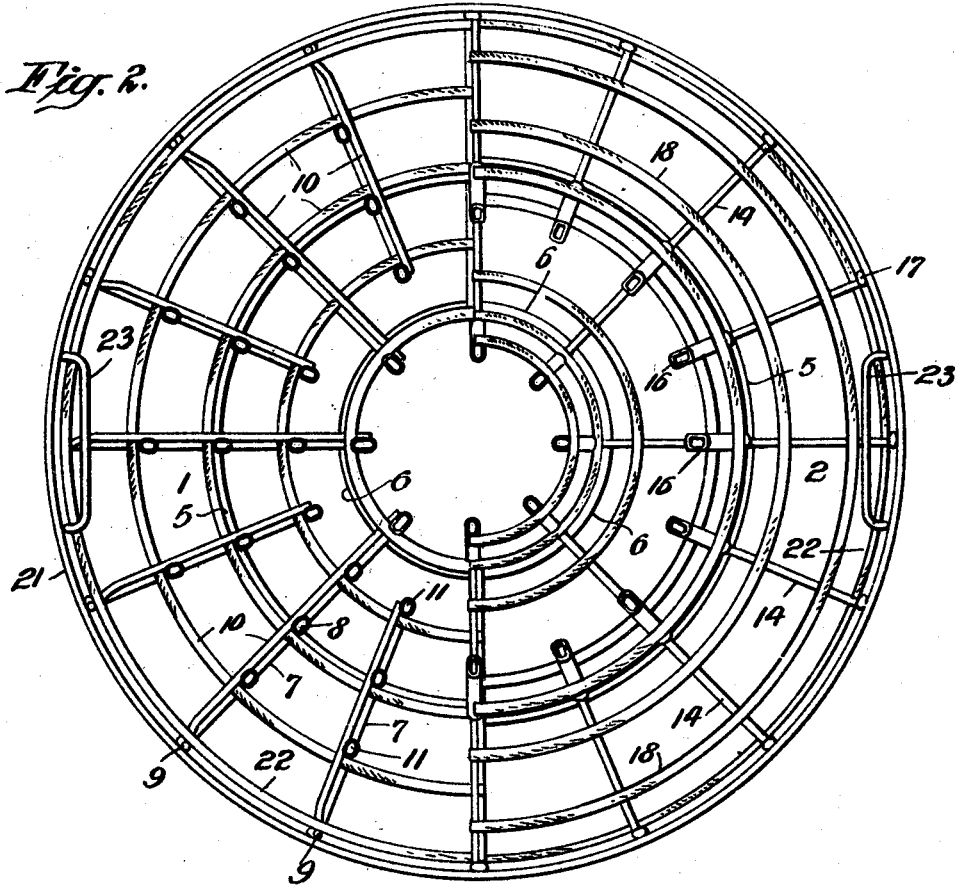
Figure 4:
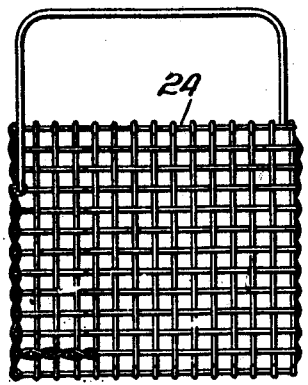
Figure 3:
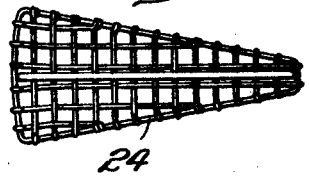

In order that the invention may clearly be understood, I will describe in detail a dish rack embodying it which is shown in my copending application filed August 17, 1922. Serial No. 582,396, of which the present application is a division. This dish rack is shown in the accompanying drawings in which Fig. 1 is a side elevation;
Fig. 2 is a top view; and
Figs. 3 and 4 are respectively a top view and side view of a silver basket to be used in the dish rack.

The dish rack is arranged to hold dishes placed in it with their soiled surfaces substantially vertical, regardless of the manner in which the dishes are placed in the rack. This results in locating the soiled surfaces of the dishes in position to receive the fans of fluid projected from the inclined nozzles of the projectors at such an angle that the washing fluid peels the dirt from the surfaces. The dish rack serves also to retain cups and glasses with their bottoms at an angle to the horizontal, so that they are drained effectively after they have been rinsed.

An important feature of the dish rack is that while it is strong and of simple construction and does not obstruct the sprays of washing and rinsing fluid, it is, nevertheless, arranged so that the articles to be washed cannot come into contact with any metal parts. This avoids chipping and staining the dishes.

The dish rack shown in the drawings has one side 1 adapted to hold plates and its opposite side 2 adapted to hold cups and glasses.

The bottom of the dish rack is formed of open wire-work, which may conveniently be termed open wire mesh. In the form shown, this bottom is formed by two circular hoops 4, 6, two semi-circular wires 5, 5' and a plurality of radial wires 7, 14.

The radial wires 7 on the plate side 1 of the dish rack are horizontal and are comparatively closely spaced. They are soldered or otherwise secured to the hoops 4, 6 and the semi-circular wire 5.

Each of the radial wires 7 is bent to form a plurality of upwardly projecting loops 8. The portions of the radial wires forming the sides of each loop are pressed together so that the loops in effect form pins projecting upwardly from the bottom of the rack. The outer ends of the radial wires 7 are also turned upwardly to form similar peripheral pins 9. Over the bottom of the side 1 of the rack is formed a net-work of non-metallic material. In the form shown, this network consists of radial and circumferential reeds 10, which are secured to the radial wires 7 by rings of fine wire not shown in the drawings. The reeds 10 prevent the edges of the plates from coming into contact with the metal wires which form the bottom of the rack. Each of the pins 8 is covered with a casing 11 of soft material, which may conveniently take the form of a rubber tube. The casings 11 prevent the dishes from coming into contact with the metal pins 8.

The pins 8 are so positioned as to leave long, narrow spaces between them extending in numerous different directions. This arrangement permits the placing of plates between the pins when the dishes are turned either circumferentially or radially or at various different angles to the circumference or the radii of the rack. The pins are placed at such a distance from each other that plates placed in any of these directions are held substantially vertical.

The radial wires 14 of the cup and glass side 2 of the dish rack are inclined upward towards the outer edge of the rack. They have, at their outer ends, vertically depending portions 15 which are secured, at their lower ends, to the outer bottom hoop 4. The radial wires 14 are secured near their inner ends to the inner hoop 6. These wires are secured at an intermediate point to the semicircular wire 5' which is located in a horizontal plane above the plane of the hoops 4, 6. Loops having their sides closely spaced are formed in the radial wires 14, so as to form pins 16, similar to the pins 8 but more widely spaced, and peripheral pins 17.

The inclined radial wires 14 are covered with a net-work of circumferential and radial reeds 18 which form an inclined support for the bottoms of cups and glasses and maintain these articles out of contact with the radial wires. The pins 16 prevent these articles from sliding inwardly on the inclined surface. Like the pins 8, they are provided with soft tubular casings 19. The dish rack is provided with a supporting wire hoop 20 which is secured to the outer sides of the peripheral pins 9 and to the outer sides of the depending wires 15 a little above the bottom of the rack. The dish rack may be strengthened by an additional hoop 21 above the hoop 20 and secured in the same manner. Circumferential reeds 22 may be secured to the inside of the peripheral pins 9 and the inside of the peripheral pins 17 to prevent the dishes from coming into contact with any wire at the periphery of the rack. The rack is provided with two handles 23 to facilitate lifting it.

The dish rack which has been described may be used by placing it, after it is filled with dishes, in a round tank of a dishwashing machine. The rack may be held by allowing its supporting hoop 20 to rest upon an internal bead or other projection in the tank. The open construction of the tank and the manner in which the dishes are held therein allows a washing medium projected upwardly through the bottom of the tank to have free and effective access to the dishes.

It will be understood that if the number of plates or the number of cups and glasses to be washed is sufficient to justify it, the machine may be provided with dish racks having both sides similar to the side 1 of the rack shown for the support of plates or with both sides similar to the side 2 for the support of cups and glasses.

In order to provide for the support of table silver, an open-mesh basket 24 is provided. As shown in Figs. 3 and 4, this basket is wedge-shaped, so that it may be inserted between the pins 8 of two of the adjacent radial wires 7 of the side 1 of the dish rack. When so inserted, it rests upon the reeds 10 and is held securely in position by the pins 8. The table silver may be placed in the basket either before or after the basket has been thus inserted in the dish rack.

What is claimed is:

A dish rack having a circular, open mesh bottom and a plurality of radial rows of rigid members projecting vertically upward from said bottom, unconnected at their upper ends, the members of the separate rows being spaced from each other.

In testimony whereof I have hereunto set my hand.

HENRY R. MERSELES.